United States Patent [19]
Holland

[11] 3,879,402
[45] Apr. 22, 1975

[54] PROCESS FOR PREPARING 2-CHLORO-5-SULFAMOYLBENZOIC ACIDS

[75] Inventor: Gerald F. Holland, Old Lyme, Conn.

[73] Assignee: Pfizer Inc., New York, N.Y.

[22] Filed: Sept. 26, 1973

[21] Appl. No.: 400,704

[52] U.S. Cl.... 260/293.73; 260/239 BF; 260/239.6; 260/239.7; 260/239.8; 260/247.1 R; 260/397.7 R; 260/515 A; 260/518 A; 424/244; 424/248; 424/267; 424/317
[51] Int. Cl............................................ C07d 29/34
[58] Field of Search.. 260/293.73, 247.1 R, 239 BF, 260/518 A

[56] References Cited
FOREIGN PATENTS OR APPLICATIONS
729,430   9/1969   Belgium.................... 260/293.73

OTHER PUBLICATIONS

Name Reactions in Organic Chemistry, Surrey, (1954), Academic Press, Inc. pages 149–150.

J. Chem. Soc., (1945), pages 545–546, Hodgson et al.

*Primary Examiner*—Henry R. Jiles
*Assistant Examiner*—S. D. Winters
*Attorney, Agent, or Firm*—Connolly and Hutz

[57] ABSTRACT

A process for the synthesis of 2-chloro-5-sulfamoylbenzoic acids by diazotization of the requisite 2-amino-5-sulfamoylbenzoic acid followed by treatment of the resulting diazonium salt with a metal chloride at 60°–100° C., said products being useful hypolipidemic agents.

4 Claims, No Drawings

PROCESS FOR PREPARING 2-CHLORO-5-SULFAMOYLBENZOIC ACIDS

BACKGROUND OF THE INVENTION

This invention relates to a process for the synthesis of 2-chlorobenzoic acid derivation, and in particular to the preparation of 2-chloro-5-sulfamoylbenzoic acids, a class of compounds useful as agents for lowering blood lipid levels.

Previously described methods for preparing these useful compounds are disclosed in Belgium Pat. No. 772,381, and comprise chlorosulfonation of the corresponding 2-chlorobenzoic acid followed by treatment of the resulting 2-chloro-5-chlorosulfonylbenzoic acid with a requisite amine, thus yielding the corresponding 2-chloro-5-sulfamylbenzoic acid.

It has now been found that diazotization of a 2-amino-5-sulfamylbenzoic acid followed by treatment of the resulting diazonium salt with a metal chloride results in the formation of a hypolipemic 2-chloro-5-sulfamylbenzoic acid. The success of this claimed process is especially surprising since diazotization of 2-aminobenzoic acid is considered, as taught by Fieser and Fieser, "Reagents for Organic Synthesis," John Wiley and Sons, Inc., New York, N.Y., 1967, Vol. I, p. 360, an ideal source of benzyne.

The present process offers an advantage over the process disclosed in the previously mentioned Belgium Patent, in that great caution must be exercised that when the 2-chloro-5-chlorosulfonylbenzoic acid is reacted with an amine, displacement of the 2-chloro substituent by said amine does not occur.

SUMMARY OF THE INVENTION

It has now been discovered that compounds of the formula

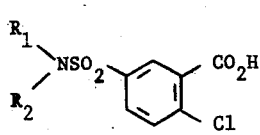

wherein $R_1$ is selected from the group consisting of hydrogen and alkyl containing from 1 to 4 carbon atoms; $R_2$ is selected from the group consisting of alkyl containing from 1 to 4 carbon atoms and phenylalkylene of the formula

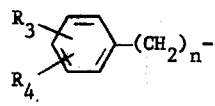

wherein $n$ is an integer of 0 to 3 and $R_3$ and $R_4$ are each selected from the group consisting of hydrogen, methyl, chloro and bromo; and $R_1$ and $R_2$ when considered together with the nitrogen to which they are attached form a heterocyclic ring selected from the group consisting of morpholino, hexamethyleneimino, piperidino and mono- and dimethylpiperidino, which comprises contacting in a reaction-inert solvent a diazonium salt of the formula

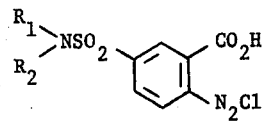

with a metal chloride selected from the group consisting of $CuCl$, $CuCl_2$, $FeCl_2$, $FeCl_3$, $ZnCl_2$, $CoCl_2$, $AlCl_3$, $HgCl_2$, $NiCl_2$, $SnCl_4$, $CrCl_3$ and $SbCl_3$ in a reaction-inert solvent at a temperature of 60°–100° C.

A preferred feature of the process of the present invention is the use of $CuCl_2$ as the metal chloride, water as the reaction-inert solvent and a reaction temperature of 70°–80° C.

Also considered within the scope of the present invention is the process wherein corresponding 2-chlorodiazo-5-sulfamyl-(lower)alkyl benzoate esters are employed in the reaction with metal chlorides.

DETAILED DESCRIPTION OF THE INVENTION

The aforementioned reaction is depicted in the following scheme

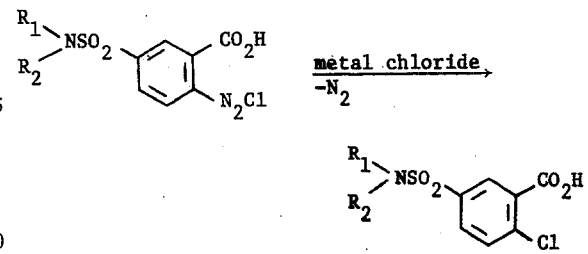

wherein $R_1$, $R_2$ and the metal chlorides are as previously described.

In the above reaction of the diazonium chloride salt with a metal chloride, the ratio of reactants is appoximately equimolar. In practice, a slight excess of from 10–20% excess of the metal chloride can be employed without markedly affecting the quality of the product formed.

It is also desirable to conduct said reaction in a reaction-inert solvent as opposed to conducting it neat. By such a solvent, or mixtures thereof, is contemplated those, which under the conditions of the instant process, do not enter into appreciable reaction with either the starting reagents or products. It is preferred that the solvent be water. Because of decreased water solubility due to the lipophylic nature of some of the diazonium salts, it is sometimes desirable, though not critical to the success of said process, that a water-miscible reaction-inert solvent be added to the water. Such solvents, which may accound for as much as 25% of the solvent volume, include tetrahydrofuran, dimethoxyethane, dioxane, dimethylformamide, acetone, dimethylsulfoxide and the like.

Reaction time is not critical and is inherently dependent on concentration, reaction temperature and reactivity of the starting reagents. In general, when reaction temperatures of 70°–80° C. are employed, the reaction time will vary from 5–20 minutes.

As previously indicated, heating of the reaction mixture to facilitate the present process is of a practical necessity, since lower reaction temperatures lead to slower formation of product. Too rigorous a heating could lead to the formation of unwanted by-products, thus lessening the quality of the product formed. A temperature range of 60°–100° C. is operative, while a range of 70°–80° C. is preferred.

At the conclusion of the reaction, the mixture is cooled and the precipitated product is filtered. When a water-miscible organic solvent has been added to aid in solubilizing the reagents, it is preferred that said solvents be removed in vacuo prior to cooling of the reaction.

The product is purified by methods familiar to those skilled in the art, and comprise recrystallization from a suitable solvent, reprecipitation from an aqueous basic solution or chromatographing on a suitably packed column.

The starting diazonium chloride salts are sensitive reagents which are not isolated, but prepared in N.Y. using the corresponding 2-amino-5-sulfamylbenzoic acid, sodium nitrite and an excess of hydrochloric acid. The use of this procedure in the synthesis of the starting diazonium chloride salts is one which is employed repeatedly in the chemical literature wherein aromatic amines are converted to diazonium chloride salts. In addition to the diazonium chloride salts, other salts, such as the sulfate salt, may be employed with comparable results in the present process. The aforementioned methods for preparing diazonium salts are reviewed by Wagner and Zook, "Synthetic Organic Chemistry," John Wiley and Sons, Inc., New York, N. 1953, Chapt. 30, p. 772.

The 2-amino-5-sulfamylbenzoic acids are, in turn, prepared by treatment of the requisite sulfonyl chlorides with the appropriate amine. The sulfonyl chlorides are prepared by chlorosulfonation of anthranilic acid, isotoic anhydride or (lower)alkyl anthranilates.

The amines used in preparing the intermediates are either known in the chemical literature or are preparable by well-known procedures.

As previously mentioned, the compounds of the present process are useful as hypolipemic agents and lower blood cholesterol levels. The aforementioned Belgium Patent teaches how to use these compounds for the indicated utility.

Of particular interest in the present invention are the synthesis of 2-chloro-5-sulfamylbenzoic acids wherein $R_1$ and $R_2$ taken together with the nitrogen to which they are attached are cis-3,5-dimethylpiperidino and where $R_1$ is ethyl and $R_2$ is $\beta$-p-chlorophenethyl.

The following examples are given by way of illustration, and are not to be construed as limitations of this invention, many variations of which are possible within the scope and spirit thereof.

EXAMPLE 1

2-Chloro-5-(cis-3,5-dimethylpiperidinosulfonyl)benzoic Acid

To a stirred suspension of 1.55 g. (5 m moles) of 2-amino-5-(cis-3,5-dimethylpiperidinosulfonyl)benzoic acid and 25 g. of ice in 25 ml. of 12N hydrochloric acid is added dropwise over a three-minute period 380 mg. (5.5 m moles) of sodium nitrite in 30 ml. of water while the temperature is maintained at 0°–5° C. After stirring for 20 min., the mixture is filtered and the filtrate added dropwise to 740 mg. (5.5 m moles) of cupric chloride in 15 ml. of 12N hydrochloric acid. The mixture is stirred at room temperature and is then heated at 65°–75° C. for 7–10 min. Ice-water (50 ml.) is added to the reaction mixture and the resulting precipitate is filtered and dried, 750 mg., m.p. 227°–228° C. The analytical sample is recrystallized from isopropanol and then acetone-hexane, m.p. 244°–246° C.

| Anal. Calc'd for $C_{14}H_{18}O_4ClNS$: | C, 50.67; H, 5.47; N, 4.22. |
|---|---|
| Found: | C, 50.91; H, 5.47; N, 4.35. |

EXAMPLE 2

Starting with the appropriate 2-amino-5-sulfamoylbenzoic acid and following the procedure of Example 1, the following congeners are prepared: 2-chloro-5-(morpholinosulfonyl)benzoic acid; 2-chloro-5-(piperidinosulfonyl)benzoic acid; 2-chloro-5-(dimethylaminosulfonyl)benzoic acid; 2-chloro-5-(N-ethyl-N-n-propylaminosulfonyl)benzoic acid; 2-chloro-5-(4,4-dimethylpiperidinosulfonyl)benzoic acid; 2-chloro-5-(n-butylaminosulfonyl)benzoic acid; 2-chloro-5-(3,4-dimethylpiperidinosulfonyl)benzoic acid; 2-chloro-5-(di-n-butylaminosulfonyl)benzoic acid; and 2-chloro-5-(hexamethyleneiminosulfonyl)benzoic acid.

EXAMPLE 3

2-Chloro-5-($\beta$-[p-chlorophenethyl]aminosulfonyl)-benzoic Acid

After allowing 1.8 g. (5 m moles) of 2-amino-5-($\beta$-[p-chlorophenethyl]-aminosulfonyl)benzoic acid and 25 g. of ice in 25 ml. of 12N hydrochloric acid to stir for 10 min., 380 mg. (5.5 m moles) of sodium nitrite in 3 ml. of water is added over a 2 min. period and at a temperature of 0°–5° C. Stirring is continued at 3°–5° C. for 20 min., followed by the addition of 740 mg. (5.5 m moles) of cupric chloride in 15 ml. of 12N hydrochloric acid. The resulting reaction mixture is stirred at room temperature for 30 min., and is then heated for 15 min. at 80° C. The mixture is cooled and the crude product filtered and dried, 1.2 g. The purified product is obtained by column chromatography on silica gel using benzene-5% acetic acid as the eluate, m.p. 168°–170° C.

EXAMPLE 4

The procedure of Example 3 is repeated, starting with the requisite 2-amino-5-sulfamoylbenzoic acid, to provide the following analogs:

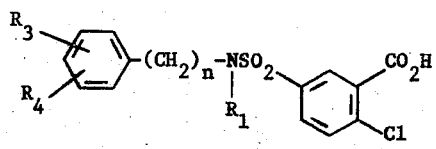

| $R_1$ | $R_3$ | $R_4$ | n |
|---|---|---|---|
| H | 3—Cl | 4—Br | 0 |
| $CH_3$ | 3—$CH_3$ | 4—Br | 0 |
| $CH_3$ | H | 4—Cl | 0 |
| n—$C_3H_7$ | H | 4—$CH_3$ | 0 |
| n—$C_3H_7$ | 2—Cl | 4—Cl | 0 |
| n—$C_4H_9$ | 3—Cl | 4—Cl | 0 |
| H | H | H | 1 |
| $CH_3$ | 2—$CH_3$ | 4—$CH_3$ | 1 |
| $C_2H_5$ | 3—$CH_3$ | 4—Cl | 1 |
| $C_2H_5$ | H | H | 1 |
| i—$C_3H_7$ | H | 4—Cl | 1 |
| H | H | 4—Br | 2 |
| H | H | 4—$CH_3$ | 2 |
| $C_2H_5$ | H | 4—Cl | 2 |
| n—$C_3H_7$ | 3—Cl | 4—Cl | 2 |
| H | H | H | 3 |
| $CH_3$ | H | 3—Cl | 3 |
| $CH_3$ | 2—$CH_3$ | 4—Cl | 3 |
| i—$C_4H_9$ | 3—Br | 4—Cl | 3 |
| t—$C_4H_9$ | H | H | 3 |

EXAMPLE 5

Starting with the appropriate 2-amino-5-sulfamylbenzoic acid and the indicated metal chloride catalyst ( ), and repeating the procedure of Example 1, the following 2-chloro-5-sulfamoylbenzoic acids are synthesized: 2-chloro-5-(cis-3,5-dimethylpiperidinosulfonyl)benzoic acid ($FeCl_3$); 2-chloro-5-(piperidinosulfonyl)benzoic acid (CuCl); 2-chloro-5-(3,3-dimethylpiperidinosulfonyl)benzoic acid ($SnCl_4$); 2-chloro-5-(di-n-propylaminosulfonyl)benzoic acid ($FeCl_3$); 2-chloro-5-(hexamethyleneiminosulfonyl)benzoic acid ($AlCl_3$); 2-chloro-5-(morpholinosulfonyl)benzoic acid ($ZnCl_2$); 2-chloro-5-(3,4-dimethylpiperidinosulfonyl)benzoic acid (CuCl); 2-chloro-5-(N-ethyl-N-n-propylaminosulfonyl)benzoic acid ($HgCl_2$); 2-chloro-5-(dimethylaminosulfonyl)benzoic acid ($FeCl_2$); 2-chloro-5-(4-methylpiperidinosulfonyl)benzoic acid ($ZnCl_2$); 2-chloro-5-(i-propylaminosulfonyl)benzoic acid ($NiCl_2$); 2-chloro-5-(N-methyl-N-phenylaminosulfonyl)benzoic acid ($CrCl_3$); 2-chloro-5-(β-phenethylaminosulfonyl)benzoic acid ($NiCl_2$); 2-chloro-5-(N-ethyl-N-(β-[p-chlorophenethyl]aminosulfonyl)benzoic acid (CuCl); 2-chloro-5-(N-ethyl-N-(β-[p-chlorophenethyl]aminosulfonyl)benzoic acid ($AlCl_3$); 2-chloro-5-(γ-phenylpropylaminosulfonyl)benzoic acid ($CoCl_2$); 2-chloro-5-(N-ethyl-N-benzylaminosulfonyl)benzoic acid ($SbCl_3$); 2-chloro-5-(N-ethyl-N-[3-methyl-4-chlorobenzyl]aminosulfonyl)benzoic acid ($HgCl_2$) and 2-chloro-5-(cis-3,5-dimethylpiperidinosulfonyl)benzoic acid ($SnCl_4$).

PREPARATION A

2-Amino-5-sulfamoylbenzoic Acids

I. 2-Amino-5-(cis-3,5-dimethylpiperidinosulfonyl)benzoic Acid a. 2-amino-5-chlorosulfonylbenzoic acid Anthranilic acid (5.5 g., 0.04 mole) is added in small portions over a period of 5 min. to 15 ml. (0.22 mole) of chlorosulfonic acid, and the resulting mixture heated to 80° C. for 1 hr. The mixture is cooled, poured into 100 ml. of ice and the aqueous portion decanted from the yellow gum, which is used immediately without further purification.

b. 2-amino-5-(cis-3,5-dimethylpiperidinosulfonyl)benzoic acid

To 50 ml. of acetone is added 3.0 g. (0.02 mole) of cis-3,5-dimethylpiperidine hydrochloride and 70 ml. of a 1N aqueous sodium hydroxide solution, and the mixture is added to the product from Preparation I-a and allowed to stir for 30 min. at room temperature. The acetone is removed in vacuo and the residual solution rendered acid with 12N hydrochloric acid. The supernatant is decanted from the precipitated material (2.1 g.) and the solid subsequently dissolved in 3 ml. of acetic acid to which is added 20 ml. of benzene. The resulting solution is column chromatographed on 50 g. of silica gel and eluted with benzene/5% acetic acid. The product, isolated by evaporation of the combined eluates, is triturated in hexane, 380 mg., m.p. 240.5°–242° C.

II. 2-Amino-5-(β-[p-chlorophenethyl]aminosulfonyl)benzoic Acid

To 15 ml. of chlorosulfonic acid (0.22 mole) is added in portions over a 5 min. period 6.5 g. (0.04 mole) of isotoic anhydride, and the resulting reaction mixture heated to 80°–90° C. The mixture is cooled, poured into 100 ml. if ice and the resulting precipitate filtered and dried in vacuo, 8.0 g., m.p. 190°–193° C. A small sample of 6-chlorosulfonylisotoic anhydride is recrystallized from acetone-hexane, m.p. 197°–199° C.

To a suspension of 2.5 g. (0.016 mole) of β-(p-chlorophenyl)ethyl amine and 80 ml. of a 1N aqueous sodium hydroxide solution (0.08 mole) in 30 ml. of acetone is added 3.4 g. (0.013 mole) of 6-chlorosulfonylisotoic anhydride, and the resulting reaction mixture allowed to stir at room temperature for 30 min. The resulting solution is acidified with 12N hydrochloric acid, diluted with 100 ml. of water and filtered. The filtered solid, 1.3 g., m.p. 198°–201° C., is further purified by recrystallization from acetone-water, m.p. 202°–205° C.

III. Employing the indicated Preparation Procedure, the following 2-amino-5-sulfamylbenzoic acids are prepared as intermediates for the instant process:

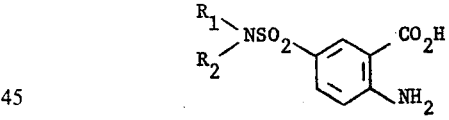

| $R_1$ | $R_2$ | Preparation |
|---|---|---|
|  | —$(CH_2)_5$— | A-I |
|  | —$(CH_2)_2O(CH_2)_2$— | A-I |
| $CH_3$— | $CH_3$— | A-I |
| $C_2H_5$— | n-$C_3H_7$— | A-II |
|  | —$(CH_2)_2C(CH_3)_2(CH_2)_2$— | A-II |
| H— | n-$C_4H_9$— | A-I |
|  | —$(CH_2)_2[CH(CH_3)]_2CH_2$— | A-II |
| n—$C_4H_9$— | n—$C_4H_9$— | A-I |
|  | —$(CH_2)_6$— | A-I |
|  | —$(CH_2)_6$— | A-II |
| H— | 3—Cl—4—Br$C_6H_3$— | A-I |
| $CH_3$— | 3—$CH_3$—4—Br$C_6H_3$— | A-I |
| $CH_3$— | 4—Cl$C_6H_4$— | A-II |
| n—$C_3H_7$— | 4—$CH_3C_6H_4$— | A-I |
| n—$C_3H_7$— | 2,4—$Cl_2C_6H_3$— | A-I |
| n—$C_4H_9$— | 3,4—$Cl_2C_6H_3$— | A-II |
| H— | $C_6H_5CH_2$— | A-II |
| $CH_3$— | 2,4—$(CH_3)_2C_6H_3CH_2$— | A-I |
| $C_2H_5$— | 3—$CH_3$—4—Cl$C_6H_3CH_2$— | A-I |
| $C_2H_5$— | $C_6H_5CH_2$— | A-II |
| i—$C_3H_7$— | 4—Cl$C_6H_4CH_2$— | A-II |
| H— | 4—Br$C_6H_4(CH_2)_2$— | A-I |
| H— | 4—$CH_3C_6H_4(CH_2)_2$— | A-I |
| $C_2H_5$— | 4—Cl$C_6H_4(CH_2)_2$— | A-II |
| n—$C_3H_7$— | 3,4—$Cl_2C_6H_3(CH_2)_2$— | A-II |

-Continued

| R₁ | R₂ | Preparation |
|---|---|---|
| H— | C₆H₅(CH₂)₃— | A-I |
| CH₃— | 3—ClC₆H₄(CH₂)₃— | A-I |
| CH₃— | 2-CH₃—4—ClC₆H₃(CH₂)₃— | A-II |
| i—C₃H₉— | 3—Br—4—ClC₆H₃(CH₂)₃— | A-I |
| t—C₄H₉— | C₆H₅(CH₂)₃— | A-II |
| | —(CH₂)₃C(CH₃)₂CH₂— | A-I |
| n—C₃H₇— | n—C₃H₇— | A-I |
| | —(CH₂)₂CH(CH₃)(CH₂)₂— | A-II |
| H— | i—C₃H₇— | A-I |
| C₂H₅— | C₆H₅— | A-II |
| H— | C₆H₅(CH₂)₂— | A-I |

What is claimed is:

1. A process for the preparation of compounds of the formula:

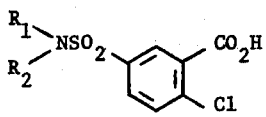

wherein R₁ is selected from the group consisting of hydrogen and alkyl containing from 1 to 4 carbon atoms; R₂ is selected from the group consisting of alkyl containing from 1 to 4 carbon atoms and phenylalkylene of the formula

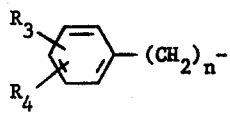

wherein $n$ is an integer of 0 to 3 and R₃ and R₄ are each selected from the group consisting of hydrogen, methyl, chloro and bromo; and R₁ and R₂ when considered together with the nitrogen to which they are attached form a heterocyclic ring selected from the group consisting of morpholino, hexamethyleneimino, piperidino and mono- and dimethylpiperidino, which comprises contacting in a reaction-inert solvent a diazonium salt of the formula

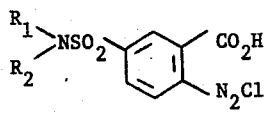

with a metal chloride selected from the group consisting of CuCl, CuCl₂, FeCl₂, FeCl₃, ZnCl₂, CoCl₂, AlCl₃, HgCl₂, NiCl₂, SnCl₄, CrCl₃ and SbCl₃ at a reaction temperature of 60°–100° C.

2. The process of claim 1 wherein the metal chloride is CuCl₂, the reaction-inert solvent is water and the reaction temperature is 70°–80° C.

3. The process of claim 2 wherein R₁ is ethyl and R₂ is of the formula

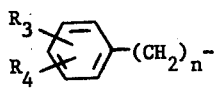

wherein R₃ is p-chloro, R₄ is hydrogen and $n$ is 2.

4. The process of claim 2 wherein R₁ and R₂ when considered together with the nitrogen to which they are attached form cis-3,5-dimethylpiperidino.

* * * * *